United States Patent
Finch

(10) Patent No.: US 7,217,020 B2
(45) Date of Patent: May 15, 2007

(54) HEADLAMP ASSEMBLY WITH INTEGRATED INFRARED ILLUMINATOR

(75) Inventor: Alan W Finch, Troy, MI (US)

(73) Assignee: General Motors Corporation, Detroit, MI (US)

( * ) Notice: Subject to any disclaimer, the term of this patent is extended or adjusted under 35 U.S.C. 154(b) by 206 days.

(21) Appl. No.: 10/995,908

(22) Filed: Nov. 24, 2004

(65) Prior Publication Data

US 2006/0109671 A1    May 25, 2006

(51) Int. Cl.
*F21W 101/10* (2006.01)
(52) U.S. Cl. ..................... 362/544; 362/507
(58) Field of Classification Search ............. 362/543, 362/544, 84, 507
See application file for complete search history.

(56) References Cited

U.S. PATENT DOCUMENTS

| | | | |
|---|---|---|---|
| 5,001,558 A | 3/1991 | Burley et al. | |
| 6,634,776 B2 | 10/2003 | Yagi et al. | |
| 6,644,840 B2 * | 11/2003 | Yagi et al. | 362/510 |
| 6,774,367 B2 | 8/2004 | Stephan et al. | |
| 6,817,740 B2 | 11/2004 | Kobayashi et al. | |
| 6,827,473 B2 | 12/2004 | Kobayashi | |
| 2002/0003473 A1 * | 1/2002 | Makita et al. | 340/435 |
| 2003/0076688 A1 * | 4/2003 | Kobayashi | 362/510 |
| 2005/0088851 A1 * | 4/2005 | Davies et al. | 362/516 |

OTHER PUBLICATIONS

United Nations Economic and Social Council, Economic Commission for Europe, "Report of the Working Party on Lighting and Light-Signalling (GRE) on its Fifty-First Session" (UNECE Publication No. TRANS/WP.29/GRE/51), Nov. 10, 2003.

* cited by examiner

*Primary Examiner*—Laura Tso
(74) *Attorney, Agent, or Firm*—Timothy J. Marsh

(57) ABSTRACT

A headlamp assembly according to the invention includes an integrated night vision illuminator element, such as an infrared illuminator. The headlamp assembly also includes a low beam light bulb element and a high beam light bulb element. A lens attached to the front of the headlamp housing encloses the two light bulb elements and the infrared illuminator within the housing. The headlamp assembly is preferably an integrated module that can be installed quickly and easily into an automobile.

19 Claims, 3 Drawing Sheets

HEADLAMP ASSEMBLY WITH INTEGRATED INFRARED ILLUMINATOR

TECHNICAL FIELD

The invention generally relates to automotive lighting assemblies. More particularly, the invention relates to an automotive headlamp capsule having an integrated infrared ("IR") illuminator.

BACKGROUND

An increasing number of automobiles are now offered with night visions systems designed to enhance driver visibility in low light environments. Briefly, such night vision systems include an IR light source mounted on the automobile and a compatible IR detector or camera configured to detect IR light waves reflected from objects in front of the automobile. The emitted and reflected IR energy, while invisible to the unaided human eye, is detectable by an IR camera tuned to the frequency of the emitted IR energy. The IR camera can output a video signal to a display, such as a head-up display, to provide an enhanced view of the approaching environment to the driver. Older night vision systems operated with far-IR or mid-IR light sources, while newer active night vision system operate with near-IR light sources. Near-IR light sources or illuminators include, for example, IR laser diodes, filtered incandescent light sources, or the like.

Near-IR illuminators have a beam pattern similar to that of a high beam automotive headlamp and, therefore, must be aligned to ensure proper operation of the night vision system. Such alignment can be time consuming and costly (requiring special alignment equipment) in traditional deployments where the IR illuminators are mounted to the vehicle bumpers, grill, or other locations at the front of the vehicle. Furthermore, bumper-mounted IR illuminators can introduce styling concerns, may be susceptible to damage caused by road debris, and, due to their relatively low mounting position, may not provide an optimized IR beam pattern for enhanced pedestrian detection distances.

The automotive prior art is replete with various headlamp assemblies, modules, capsules, and systems. Automotive assembly plants utilize headlamp aiming equipment to properly align the low beam and/or high beam headlamp elements. It would be desirable to leverage existing headlamp aiming equipment for use in the alignment of IR illuminators—such use would eliminate the need for customized aiming systems designed specifically for IR illuminators.

Accordingly, it is desirable to have a headlamp assembly (e.g., a headlamp capsule) that includes an integrated IR source, where the IR source can be aligned with conventional headlamp aiming equipment. Furthermore, other desirable features and characteristics of the invention will become apparent from the subsequent detailed description and the appended claims, taken in conjunction with the accompanying drawings and the foregoing technical field and background.

BRIEF SUMMARY

A headlamp assembly according to the invention includes an integrated IR illuminator. The headlamp assembly is suitably configured such that the headlamp elements (low and high beam) and the IR illuminator can be aligned using existing headlamp aiming equipment. The headlamp assembly is also suitably configured to provide an relatively high mounting location for the IR illuminator, which is desirable for practical deployments.

The above and other aspects of the invention may be carried out in one form by a headlamp assembly including a headlamp housing, at least one visible light projector coupled to the headlamp housing, and at least one night vision illuminator coupled to the headlamp housing.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In addition, those skilled in the art will appreciate that the invention may be practiced in conjunction with any number of vehicular deployments and that the automobile application described herein represents merely one example deployment of the invention.

For the sake of brevity, conventional techniques related to headlamp design, headlamp alignment equipment, night vision systems, IR illuminators, sources, and emitters, IR cameras, heads-up displays, and other functional aspects of the systems (and the individual operating components of the systems) may not be described in detail herein.

Figure 1:
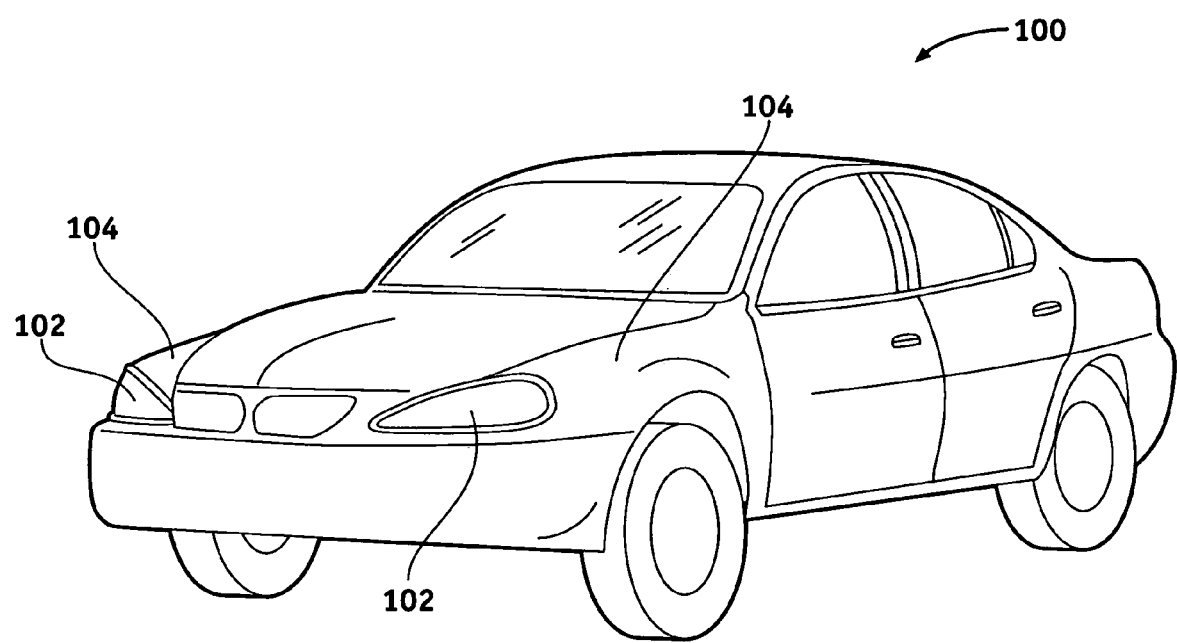
FIG. 1 is a perspective view of an automobile.

FIG. 1 is a front perspective view of an automobile 100 that may incorporate headlamp assemblies 102 as described in more detail herein. Typically, headlamp assemblies 102 are "mirror images" of each other and, therefore, the following description applies equivalently to either a left side assembly or a right side assembly. Headlamp assemblies 102 may be mounted within suitably sized headlamp ports formed within the body 104 of automobile 100. For example, such headlamp ports may be formed within the fenders of automobile 100 or within a front fascia of automobile 100. Although not shown in FIG. 1, headlamp assemblies 102 may be configured as retractable or foldable units that can be hidden from view when not in use. The invention described herein can be equivalently incorporated into such retractable assemblies.

Figure 2:
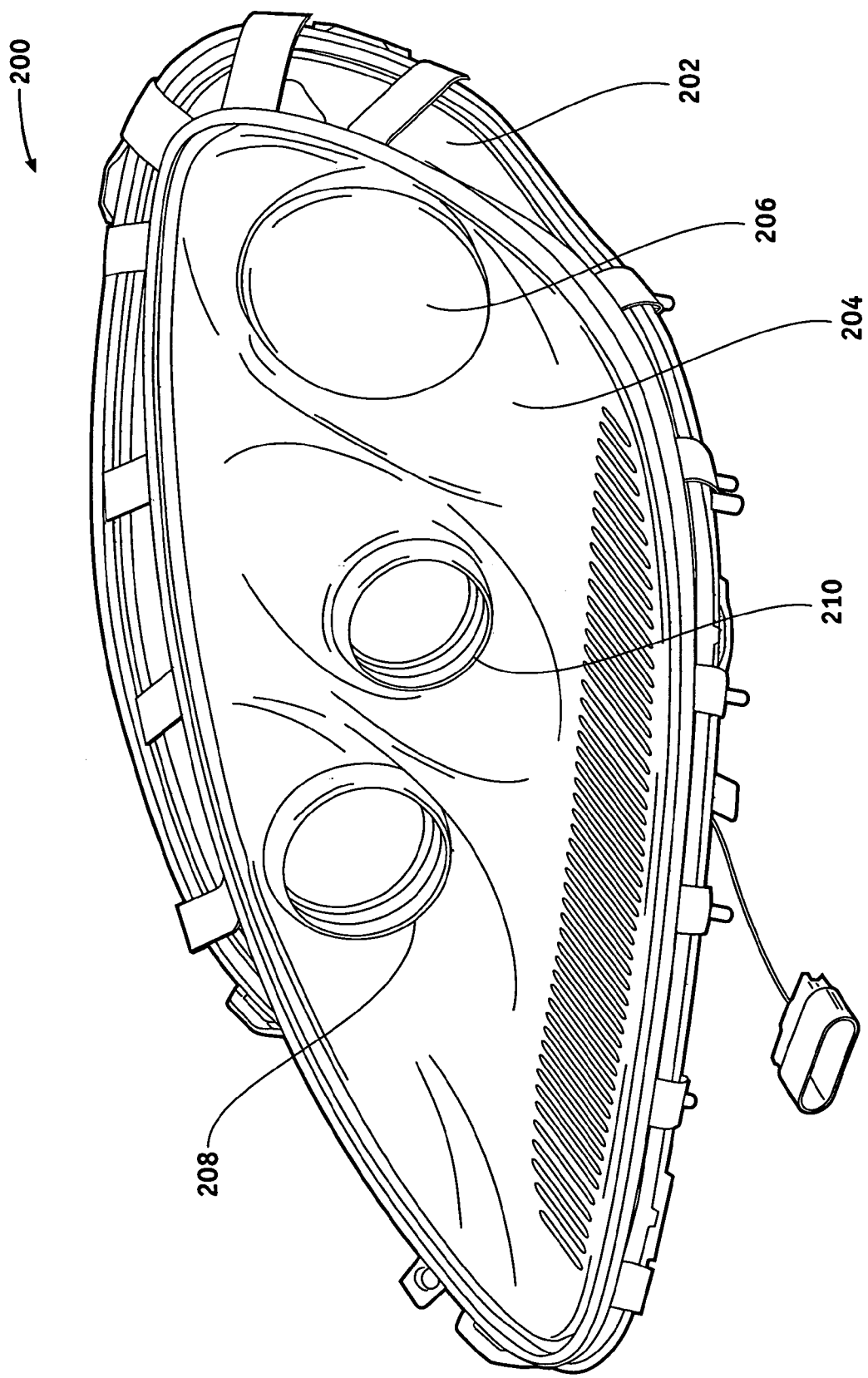
FIG. 2 is a front perspective view of a headlamp assembly configured in accordance with the invention.
Figure 3:
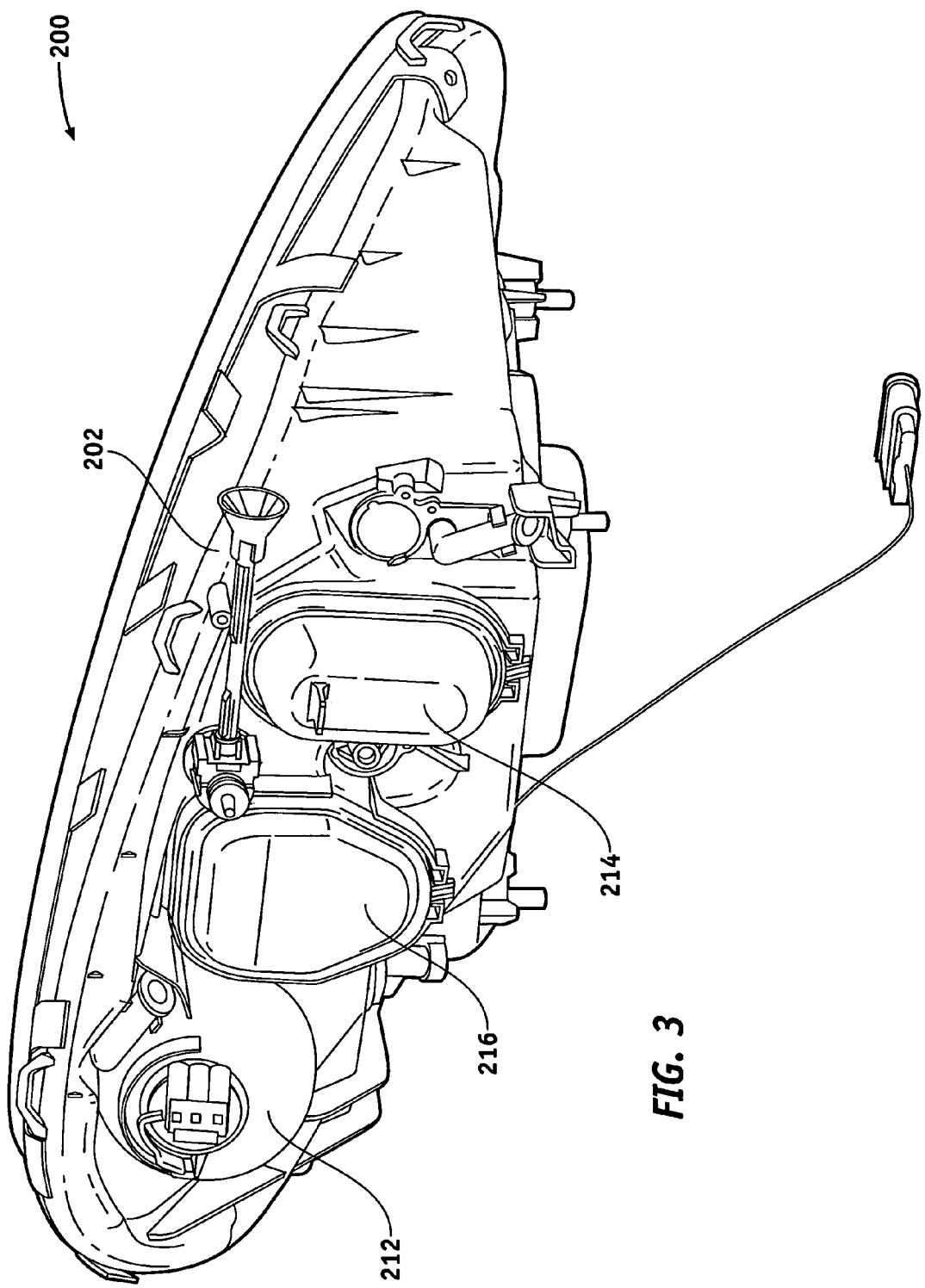
FIG. 3 is a rear perspective view of the headlamp assembly shown in FIG. 2.

FIG. 2 is a front perspective view of an example headlamp assembly 200 configured in accordance with the invention, and FIG. 3 is a rear perspective view of headlamp assembly 200. The specific size, shape, and layout of components within headlamp assembly 200 and the specific size, shape, and overall configuration of headlamp assembly 200 itself may vary from one vehicle to another. Headlamp assembly 200 generally includes a headlamp housing 202, a lens 204, a low beam projector 206, a high beam projector 208, a night vision illuminator 210, a low beam socket or receptacle 212, a high beam socket or receptacle 214, and an illuminator socket or receptacle 216. To take advantage of existing headlamp alignment methodologies, headlamp assembly 200 preferably includes at least one high beam projector 208 and need not include any low beam projectors. Of course, a practical embodiment may incorporate any number of night vision illuminators and any number of visible light projectors, including any combination of low beam and high beam projectors.

The example embodiment shown in FIG. 2 and FIG. 3 represents a self-contained headlamp assembly 200, where low beam projector 206, high beam projector 208, and night vision illuminator 210 are coupled to and integrated into headlamp housing 202. Lens 204 is attached to headlamp housing 202 such that it encloses low beam projector 206, high beam projector 208, and night vision illuminator 210 within headlamp housing 202. As shown in FIG. 3, headlamp assembly 200 may include electrical connectors for low beam socket 212, high beam socket 214, and illuminator socket 216, where such electrical connectors are suitably configured to provide operating power to low beam projector 206, high beam projector 208, and night vision illuminator 210. In one practical deployment, two connectors are used to power the three light sources.

Headlamp housing 202 may include any number of brackets, fasteners, clips, mounting tabs, or other structural elements that enable proper placement, mounting, and/or alignment of headlamp assembly 200 within the respective headlamp port of the vehicle. In one practical embodiment, headlamp assembly 200 is designed as a unit such that alignment of night vision illuminator 210 and high beam projector 208 is accomplished via adjustment of headlamp housing 202 itself. In other words, the individual visible light projectors and night vision illuminator 210 need not be independently adjustable within headlamp housing 202. Alternatively, headlamp assembly 200 may be configured such that the alignment of night vision illuminator 210 and high beam projector 208 is accomplished via individual adjustment mechanisms (not shown).

In a practical embodiment, night vision illuminator 210 is realized as an IR illuminator. In a preferred embodiment, night vision illuminator 210 is realized as a near-IR illuminator for deployment in a modern night vision system. Night vision illuminator 210 can be manufactured in accordance with conventional techniques and may function in a conventional manner. For example, night vision illuminator 210 may be a filtered incandescent (e.g., a halogen) light source that is filtered to remove non-IR components, an LED source that emits IR energy, a laser light source that emits IR energy, or the like. Indeed, night vision illuminator 210 may be realized as a commercially available "off the shelf" item and headlamp housing 202 may be suitably configured for compatibility with such commercially available units.

Lens 204 is preferably formed from a material or a plurality of materials having the desired optical properties and characteristics. In this regard, at least a portion of lens 204 has optical characteristics that affect an illumination pattern of energy emitted by night vision illuminator 210. For example, the portion of lens 204 within the field of view of night vision illuminator 210 may have different optical characteristics than the remaining portions of lens 204, thus resulting in a desired IR beam pattern emitted from headlamp assembly 200. For example, it might be desirable to cast a beam pattern of approximately twelve degrees to enable the IR system to adequately detect pedestrians and obstacles that are located on either side of the road. In one practical embodiment, lens 204 is formed from a clear plastic material or tempered glass.

Lens 204 and headlamp housing 202 may also be configured to provide a suitable distance between night vision illuminator 210 and lens 204. The distance should be selected to ensure proper IR beam formation and patterning, from headlamp assembly 200. It should be appreciated that the distance between night vision illuminator 210 and lens 204 may vary depending upon the specific design and configuration of headlamp assembly 200. In practice, if the distance is too short, then the IR beam pattern may be too wide and able to reach far enough down the road. On the other hand, if the distance is too long, then the IR beam pattern may be too narrow and not able to reflect off of pedestrians and obstacles on the sides of the road. Obstacle detection distances are important to give the driver enough time to recognize the obstacle and take proper actions to avoid the obstacle if necessary. Furthermore, lens 204 and headlamp housing 202 may be sized, shaped, or otherwise configured to efficiently dissipate heat generated by the visible light projectors and/or night vision illuminator, and/or to provide effective drainage of condensation.

In another practical embodiment (not shown), the headlamp assembly need not include the headlamp projectors or the night vision illuminator. Rather, such an embodiment contemplates the installation of headlamp projectors and night vision illuminators after the headlamp housing is installed in the vehicle. For example, receptacles 212, 214, and 216 (see FIG. 3) may instead be configured to receive a low beam projector element, a high beam projector element, and a night vision illuminator element, which in turn may be coupled to a wiring harness or be configured for coupling to a wiring harness. In such an embodiment, at least a portion of lens 204 may have optical characteristics that affect the illumination pattern of IR energy that is emitted from a location proximate receptacle 216. In other words, lens 204 may be configured as described above to provide the desired IR radiation pattern after installation and activation of the night vision illuminator.

While at least one example embodiment has been presented in the foregoing detailed description, it should be appreciated that a vast number of variations exist. It should also be appreciated that the embodiment or embodiments described herein are only examples, and are not intended to limit the scope, applicability, or configuration of the invention in any way. Rather, the foregoing detailed description will provide those skilled in the art with a convenient road map for implementing the preferred embodiment or embodiments. It should be understood that various changes can be made in the function and arrangement of elements without departing from the scope of the invention as set forth in the appended claims and the legal equivalents thereof.

What is claimed is:

1. A headlamp assembly comprising:
   a headlamp housing;
   at least one visible light projector coupled to said headlamp housing;
   at least one night vision illuminator coupled to said headlamp housing; and
   a lens attached to said headlamp housing, said lens enclosing said at least one visible light projector and said at least one night vision illuminator within said headlamp housing, wherein at least a portion of said lens has optical characteristics that affect illumination beam pattern width and range of energy emitted by said at least one night vision illuminator.

2. A headlamp assembly according to claim 1, wherein said at least one night vision illuminator comprises at least one infrared illuminator.

3. A headlamp assembly according to claim 2, wherein said at least one infrared illuminator comprises at least one near-infrared illuminator.

4. A headlamp assembly according to claim 1, wherein said at least one visible light projector comprises at least one low beam element.

5. A headlamp assembly according to claim 1, wherein said at least one visible light projector comprises at least one high beam element.

6. A headlamp assembly according to claim 1, wherein said at least one night vision illuminator comprises at least one filtered incandescent light source.

7. A headlamp assembly according to claim 1, wherein said at least one night vision illuminator comprises at least one laser light source.

8. A headlamp assembly comprising:
a headlamp housing;
a visible light projector integrated into said headlamp housing;
an infrared illuminator integrated into said headlamp housing; and
a lens attached to said headlamp housing, said lens enclosing said visible light projector and said infrared illuminator within said headlamp housing, wherein at least a portion of said lens has optical characteristics that affect illumination beam pattern width and range of energy emitted by said infrared illuminator.

9. A headlamp assembly according to claim 8, wherein said infrared illuminator comprises a near-infrared illuminator.

10. A headlamp assembly according to claim 8, wherein said visible light projector comprises a low beam element.

11. A headlamp assembly according to claim 8, wherein said visible light projector comprises a high beam element.

12. A headlamp assembly according to claim 8, wherein said infrared illuminator comprises a filtered incandescent light source.

13. A headlamp assembly according to claim 8, wherein said infrared illuminator comprises a laser light source.

14. A headlamp assembly comprising:
a headlamp housing;
a first receptacle integrated into said headlamp housing, said first receptacle being configured to receive an infrared illuminator;
a second receptacle integrated into said headlamp housing, said second receptacle being configured to receive a visible light projector; and
a lens attached to said headlamp housing and enclosing said infrared illuminator and said visible light projector, a portion of said lens having optical characteristics that affect illumination beam pattern width and range of infrared energy emitted from a location proximate said first receptacle.

15. A headlamp assembly according to claim 14, wherein said visible light projector is a low beam projector.

16. A headlamp assembly according to claim 15, further comprising a third receptacle integrated into said headlamp housing, said third receptacle being configured to receive a high beam projector.

17. A headlamp assembly according to claim 1, wherein said headlamp housing is configured to accommodate alignment of said at least one visible light projector and alignment of said at least one night vision illuminator via adjustment of said headlamp housing itself.

18. A headlamp assembly according to claim 8, wherein said headlamp housing is configured to accommodate alignment of said visible light projector and alignment of said infrared illuminator via adjustment of said headlamp housing itself.

19. A headlamp assembly according to claim 14, wherein said headlamp housing is configured to accommodate alignment of said visible light projector and alignment of said infrared illuminator via adjustment of said headlamp housing itself.

* * * * *